US010002317B1

(12) United States Patent
Nauman

(10) Patent No.: US 10,002,317 B1
(45) Date of Patent: Jun. 19, 2018

(54) LABEL WITH GRAPHENE LAYER AND SYSTEM FOR AUTHENTICATION OF LABEL

(71) Applicant: Brady Worldwide, Inc., Milwaukee, WI (US)

(72) Inventor: J. Michael Nauman, Little Rock, AR (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days. days.

(21) Appl. No.: 15/483,414

(22) Filed: Apr. 10, 2017

(51) Int. Cl.
*G06K 19/06* (2006.01)
*G06K 19/067* (2006.01)

(52) U.S. Cl.
CPC ................................ *G06K 19/0672* (2013.01)

(58) Field of Classification Search
CPC .... G06K 19/0672; G06K 19/00; G06K 19/07; G06K 19/067
See application file for complete search history.

(56) References Cited

U.S. PATENT DOCUMENTS

2014/0159040 A1 6/2014 Dimitrakopoulos et al.
2014/0162464 A1* 6/2014 Dimitrakopoulos ........................... H01L 23/5329 438/761
2016/0207345 A1* 7/2016 Farmer .................. B42D 25/36
2017/0042023 A1* 2/2017 Doyle .................. H05K 1/0213

* cited by examiner

*Primary Examiner* — Laura Gudorf
(74) *Attorney, Agent, or Firm* — Quarles & Brady LLP

(57) ABSTRACT

A label adapted to be attached to an item and a system for validating a label are provided. The label contains an identifying portion of a circuit path extending between at least a pair of contact points in which the identifying portion of the circuit path includes a segment containing graphene. The system can include this label and a validating device. The validating device includes a testing portion of the circuit path adapted to contact the at least the pair of contact points of the identifying portion of the circuit path in the label to thereby complete the circuit path. The testing portion of the validation device is configured to internally process and validate the label in the validating device.

20 Claims, 1 Drawing Sheet

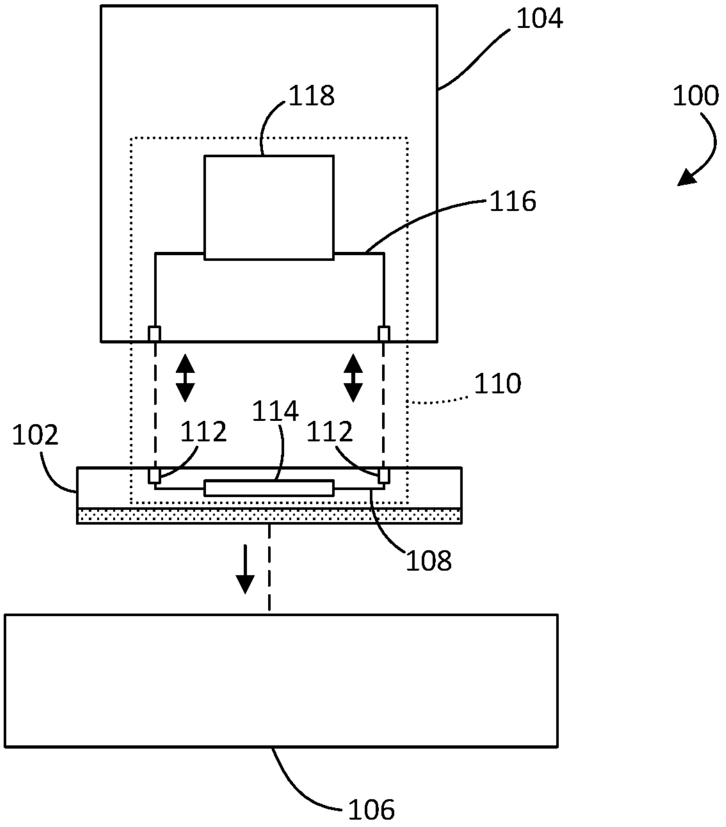
104
118
100
116
110
102
114
112
112
108
106

LABEL WITH GRAPHENE LAYER AND SYSTEM FOR AUTHENTICATION OF LABEL

CROSS-REFERENCE TO RELATED APPLICATION

Not applicable.

TECHNICAL FIELD

This disclosure relates to structures for labels for marking products in which the label have fractional circuit paths having one or more graphene segments for security and/or identification properties for use in conjunction with a validation device.

BACKGROUND

Labels are frequently attached to items for a variety of reasons. In the most general sense, labels can be attached to an item in order to provide some variety of information about the item to which the label is attached. For example, this information may be source-identifying of either the manufacturer of the item or may provide unique information about the item itself (for example, provide a unique identifier for tracking, quality control, or other purpose).

In many instances, the source-identifying information or the unique information about the label is used to authenticate the item to which the label is affixed. For example, an item of electronics may be confirmed as genuine or authentic by the label. Further, such labels can serve important inventorying or product-tracking purposes. For example, by uniquely identifying a product to which a label is affixed that product may be identified for purposes of confirming if it was produced with a group of those items that was later determined to be defective for purposes of recalls or warranty replacement. The label itself may convey or contain this information or the label may be read in conjunction with some variety of ancillary database to provide the corresponding information of interest (e.g., a serial number may be contained in or on the label which is referenced against a database to determine the information of interest).

Regardless of the reason for having the label and regardless of the information that the label communicates, it is in many cases important that such labels have authenticating, secure, or tamper-proof features. Such security features have been fabricated in a number of different ways. In many cases, labels are designed to have structures which are extremely difficult to reproduce or reverse engineer under the belief that, if it is overly expensive or technologically difficult to counterfeit a label, then the likelihood that someone will try to duplicate the label or otherwise compromise the security of the label will be reduced. Still further, some labels are designed to be tamper-resistant such that, if the label is removed from the item to which the label is affixed with the intent of placing the label on another item, then the label itself is designed to, at least in part, be destroyed in the removal process.

SUMMARY

Improved labels including a graphene component and systems including such labels and validating devices are disclosed herein. In some forms, the validating device is contactable to the label to complete and close one or more circuit paths having portions in the validating device and the label to test or validate the label. In one particular form, the validating device contains the testing portion of the circuit path and contains the more complex and expensive portion of the validation circuity. The label itself includes a portion of the circuit path which includes a graphene segment and the unique properties of the graphene segment may be leveraged to identify particular authentic labels or create unique identifiers in a larger population of labels.

For example, a label adapted to be attached to an item and a system for validating a label are provided. The label contains an identifying portion of a circuit path extending between at least a pair of contact points in which the identifying portion of the circuit path includes a segment containing graphene. The system can include this label and a validating device. The validating device includes a testing portion of the circuit path adapted to contact the at least the pair of contact points of the identifying portion of the circuit path in the label to thereby complete the circuit path. The testing portion of the validation device is configured to internally process and validate the label in the validating device.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE FIGURES

FIG. 1 is a schematic representation of system including one or more labels and a validation device in accordance with one aspect of this disclosure.

DETAILED DESCRIPTION

With reference to FIG. 1, a system 100 according to one aspect of this disclosure includes one or more labels 102 and a validation device 104.

The labels 102 are adapted to be affixed to an item 106. These labels 102 typically comprise a plurality of layers which may include one or more polymeric or paper-based layers and may be designed to be affixed to an item using a pressure-sensitive adhesive layer on one side thereof. The side opposite the pressure sensitive adhesive layer (or the surface to be attached to the item in other ways) may be printed upon or may be adapted to be printed or written upon by an individual to provide visual indicia.

The label 102 has one or more identifying portions 108 of a circuit path or circuit paths 110 running through or between the other layers. For example, during fabrication of the label 102, conductive traces may be interposed between other non-conductive or electrically insulating layers. On one of the exposed surfaces of the label 102 (e.g., the top planar surface) multiple contact points or electrodes 112 are exposed which provide terminal ends of the identifying portion or portions 108 of the circuit path or paths 110, respectively embedded in the label 102. As with conductive traces, the contact points or electrodes 112 are conductive.

Notably, at least along some portion of the identifying portion or portions 108 of the circuit path or paths 110, there is/are one or more graphene segments 114. As will be described in the description that follows, this graphene segment or segments 114 can help to uniquely identify the label 102 in conjunction with the validating device 104 and the testing portion 116 of the circuit path 110 contained therein.

The validating device 104 includes a testing portion 116 of the circuit path 110 adapted to contact the at least the pair of contact points 112 of the identifying portion 108 of the circuit path 110 in the label 102 to thereby complete the circuit path 110. The testing portion 116 of the validation device 104 may include a power source and associated circuitry 118 so to effectively test and read some physical property of the graphene segment or segments 114 in the connected identifying portion 108 of the circuit path 110. In one particular form, the physical characteristic will be electrical resistance of the graphene segment 114; however, the physical characteristic is not so limited and other type of measurements or readings whether electrical or otherwise, might be taken from the label 102 using the validation device 104.

This testing portion 116 of the validating device 104 is configured to internally evaluate, process and validate the label 102 in the validating device 104. Put another way, even though the identifying portion or portions 108 of the circuit path or paths 110 are in the label 102, the full evaluation of the identifying portion 108 of the circuit paths 110 is performed by and in the validating device 104, meaning that there is no complex evaluation portion of the circuit path 110 embedded in the label 102, which would create some complexity and cost to fabrication of the individual labels.

The validation device 104 may include a visual display to provide the information read on the label 102 and/or may include data connections to a computer or other processing device to provide the readings from the validation device 104. In the case of data connections, such connections might be wired or wireless. Information about the identifying portion or portions 108 of the circuit path or paths 110 in a particular label 102 or information corresponding thereto or associated therewith may be provided from the validating device 104 based on on-board systems or metrics [i.e., the validation device itself may be self-contained and produce information about the label 102 from directly reading the identifying portion(s) 108 and internally generating some user-discernable output based on a reading of a label 102] or may be provided by referencing the reading or collected information against a centralized or remote database, access to which database may be obtainable by the validation device 104.

In order to provide robust identification and validation, the label 102 of the system 100 may take on a number of different variations and the validation device 104 may be appropriately configured based on how the label 102 is designed and configured to work.

In some forms, it is contemplated that each label may be made to have a plurality of identifying portions of circuit paths and that one or more graphene segments might be uniquely produced and/or read to uniquely validate the label. Each of the identifying portions may have its own graphene segment or multiple graphene segments. It is even contemplated that, in some instances, some of the individual graphene segments may be shared among different identifying portions of a different circuit paths.

As one example, a plurality of graphene segments in corresponding identifying portions may be read by the validation device and each of the various graphene segments may inherently have unique properties. Collectively, these measured properties may establish a “fingerprint” for the label. The segment-to-segment variations across the graphene segments may be intrinsic to the graphene (as exactly reproducing individual segments with identical characteristics may not be possible based on control of the fabrication process) and thus inherent variations from one graphene segment to another may be observable and catalogable using software. If there are enough of these unique graphene segments with unique and difficult-to-reproduce physical characteristics in a single label, then these fingerprints may prove nearly impossible to counterfeit.

Still yet, this fingerprint may be a composite of the individual readings of the graphene segment and further involve some amount of post-collection processing of the collected individual readings. For example, the values of the some of the segments may be converted into other values or representative states [for example, by taking a reading and converting it into a state, whether a binary state (i.e., above or below a threshold reading) or one of multiple states (i.e., falling within one of a plurality of different measured ranges)] and even combining the measured values and/or the states and performing some operation on based on the collected values and/or states [for example: averaging, multiplying, adding, performing other logical operations (e.g., AND or OR or XOR), and so forth).

Recognizing that multiple measurements or readings of an otherwise static segment may result in different actual values, the validation device may employ some variety of best-fit software to determine what fingerprint set of readings best corresponds to and whether the readings collectively fall within an acceptable tolerance range. For example, while some deviations from a known fingerprint may be expected based on how the readings are collected, beyond a certain threshold such variations may be indicative of a forged label or a label that has been tampered with.

As another example, under certain conditions, graphene may be reactive in the presence of other chemical species and the binding of graphene to these chemical species (even in small amounts) may alter the electrical resistance or other properties of the graphene segment. During preparation of the labels, it is contemplated that segments of the graphene may be added to the label and then only some of these segments selectively reacted with chemical species in order to change their electrical properties. Such reactions are not likely to create precise electrical property changes, but establish possible ranges of observable and readable electrical properties. Again, these ranges may be binary in nature (i.e., a reacted graphene segment may always be expected to be above a experimentally-observed threshold value, while a non-reacted graphene segment will always be expected to be below the experimentally-observed threshold value) or there may be multiple possible reactive states or degrees per segment of graphene. For example, each graphene segment could be engineered to have one of multiple “states” or ranges which can be reproducibly created under controlled reaction conditions.

With selectively reacted graphene segments in a plurality of identifying portions in a label, these various identifying portions may then processed by the testing circuit to validate or verify the label in rather complex and difficult to counterfeit ways. In some forms, the ranges and thresholds of the electrical properties for each of the graphene segments may be kept proprietary and the processing or algorithmic processing of the detected states may also be kept proprietary. In this way there can be two non-easily resolvable obfuscation layers [the physical layer in the identification circuit(s) and the proprietary layer in the validation device]. This can make reverse engineering any particular label particularly expensive and difficult to do because it requires not only reverse engineering the hardware and/or software in the validation device, but also establishing what how the physical graphene segments have been modified to arrive at their respective physical properties. As it is expected that reaction of the graphene segments again is not perfect, there will be observable variations across populations of reacted segments which will make it extremely difficult to back out particular threshold values or ranges to which the graphene segments should be engineered in the first instance in a counterfeiting operation.

Still further, to add yet another layer of obfuscation, it is contemplated that, in the case of a plurality of graphene segments and identifying circuits, some of the graphene segments may be redundant with other graphene segments in terms of the intended state of the graphene segment and/or may be unused by the logic of the testing circuit even if the segments are chemically modified.

A set of the redundant segments might be compared to one another to collectively determine an intended state of any of the various segments collectively. For example, an averaging of the segments may be performed among a group of associated segments that gives a resultant reading or state that is more accurate than any of the individual measurements of the segments. As noted above, some segment-to-segment variation may be inherent in the fabrication process and redundancy may be necessary to ensure that the intended state can be discerned given the range of observed physical properties that are created in the segments. In this way, imperfections in the fabrication process can be masked by averaging readings to hide individual defects in particular segments while simultaneously adding another layer of security, since it may not be clear to a potential counterfeiter which of the graphene segments are being relied upon in conjunction with one another and which are not for validation purposes.

Similarly, if the fabrication process is too re-producible and there are few errors or deviations from intended or targeted values or states, then unused or un-relied-upon segments could be randomly reacted to create "garbage" information so that it would be difficult, if not impossible, to discern which segments were relevant to the logic of the testing portion of the circuit path if one did not understand how the underlying testing portion of the circuit path worked.

To help confuse potential counterfeiters, all of those redundant and/or unused graphene segments may be read by the verification device during the testing of the label.

Still further, it is contemplated that, when redundancy is present in a particular label, the validating device itself could have a randomizing feature which only checks some subset of, but not all of, the segments which would be known to be redundant with one another. In this way, someone attempting to determine which segments were legitimately being relied upon and which were not may be further confused.

While a number of techniques are disclosed above for making unique or authenticatable labels, it will be appreciated that variations may certainly be made to these examples and techniques that fall within the scope of the disclosure. For example, it is contemplated that the validation device could include multiple stages of read steps and that a first round of analysis of readings may determine how a second round of analysis of the readings will be performed.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A system for validating a label in which the label is adapted to be attached to an item, the system comprising:

a label containing an identifying portion of a circuit path extending between at least a pair of contact points in which the identifying portion of the circuit path includes a segment containing graphene; and a validating device comprising a testing portion of the circuit path adapted to contact the at least the pair of contact points of the identifying portion of the circuit path in the label to thereby complete the circuit path, and in which the testing portion of the validating device is configured to internally process and validate the label in the validating device.

2. The system of claim 1, wherein the circuit path is electrically conductive.

3. The system of claim 1, wherein once the label is attached to an item, if the label is removed from the item, the removal of the label breaks the identifying portion of the circuit path.

4. The system of claim 3, wherein the graphene is separable from the identifying portion of the circuit if the label is removed from the item.

5. The system of claim 1, wherein the label comprises one or more polymeric or paper-based layers having a pressure-sensitive adhesive layer on one side thereof.

6. The system of claim 5, wherein a side of the label opposite the pressure-sensitive adhesive layer is configured to be printed upon.

7. The system of claim 1, wherein the circuit path includes conductive traces interposed between other non-conductive or electrically-insulating layers.

8. The system of claim 1, wherein, on an exposed surface of the label, multiple electrodes are exposed which provide terminal ends of the identifying portion of the circuit path.

9. The system of claim 1, wherein the testing portion of the validating device includes a power source and associated circuitry to test and read a physical characteristic of the graphene segment in the identifying portion of the circuit path.

10. The system of claim 9, wherein the physical characteristic is electrical.

11. The system of claim 10, wherein the physical characteristic is electrical resistance.

12. The system of claim 1, wherein the label includes a plurality of identifying portions of circuit paths and wherein one or more unique graphene segments are read by the validating device to validate the label.

13. The system of claim 12, wherein each of the plurality of identifying portions of circuit paths has one or more graphene segments.

14. The system of claim 12, wherein at least one of the graphene segments is shared among different identifying portions of the plurality of identifying portions of the circuit paths.

15. The system of claim 12, wherein the validating device is configured to read the plurality of graphene segments in corresponding identifying portions to establish a fingerprint for the label.

16. The system of claim 15, wherein the fingerprint is based on variations from one graphene segment to another.

17. The system of claim 12, wherein the validating device is configured to convert each individual reading of each of the graphene segments into binary states and combine the binary states with one another.

18. The system of claim 17, wherein the system comprises at least two layers of non-easily resolvable obfuscation layers including proprietary ranges and thresholds of electrical properties for each of the graphene segments and algorithmic processing of the binary states in validation.

19. The system of claim 12, wherein at least some of the plurality of graphene segments are reacted during production to create an observable variation across populations of reacted graphene segments.

20. The system of claim 12, wherein at least some of the plurality of graphene segments are fabricated to be redundant with one another.

* * * * *